US009833859B2

(12) United States Patent
Kachline et al.

(10) Patent No.: US 9,833,859 B2
(45) Date of Patent: Dec. 5, 2017

(54) ELECTRIC ARC TORCH WITH COOLING CONDUIT

(71) Applicant: Lincoln Global, Inc., City of Industry, CA (US)

(72) Inventors: Jeffrey L. Kachline, Highland Heights, OH (US); Matthew Dingeldein, Westlake, OH (US)

(73) Assignee: LINCOLN GLOBAL, INC., City of Industry, CA (US)

( * ) Notice: Subject to any disclaimer, the term of this patent is extended or adjusted under 35 U.S.C. 154(b) by 434 days.

(21) Appl. No.: 14/486,106

(22) Filed: Sep. 15, 2014

(65) Prior Publication Data

US 2016/0074973 A1  Mar. 17, 2016

(51) Int. Cl.
*B23K 9/32* (2006.01)
*B23K 9/173* (2006.01)
(Continued)

(52) U.S. Cl.
CPC .............. *B23K 9/323* (2013.01); *B23K 9/173* (2013.01); *B23K 9/285* (2013.01); *B23K 9/164* (2013.01); *B23K 37/003* (2013.01)

(58) Field of Classification Search
CPC ...... B23K 37/003; B23K 9/323; B23K 9/164; B23K 9/173; B23K 9/285
(Continued)

(56) References Cited

U.S. PATENT DOCUMENTS 3,496,328 A * 2/1970 Moerke ................. B23K 9/291
                                                    219/137.42
3,576,423 A * 4/1971 Bernard ................. B23K 9/123
                                                    219/136
(Continued)

FOREIGN PATENT DOCUMENTS

CN    201787262 U    4/2011
CN    202199923 U    4/2012
(Continued)

OTHER PUBLICATIONS

Steed, et al., "Hybrid Robotic-welding Gun", online document available at http://www.metalformingmagazine.com/magazine/article.asp?aid=7722, Oct. 1, 2012, accessed on Aug. 6, 2014.
(Continued)

*Primary Examiner* — Arthur O Hall
*Assistant Examiner* — Joseph A Greenlund
(74) *Attorney, Agent, or Firm* — Brad C. Spencer

(57) ABSTRACT

An electric arc torch includes a torch base, and a cooling conduit having a conduit wall forming a central axial bore and having a plurality of longitudinal cooling channels spaced circumferentially around the bore. The cooling channels extend through the conduit wall from a first end portion to a second end portion of the conduit. The cooling channels include both a plurality of cooling liquid distribution channels and a plurality of cooling liquid return channels alternately arranged within the conduit wall. The conduit includes a circumferential cooling liquid manifold in fluid
(Continued)

communication with each of the cooling liquid distribution channels, a circumferential return manifold in fluid communication with each of the cooling liquid return channels, and a circumferential recirculation manifold in fluid communication with each of the cooling liquid distribution and return channels such that the cooling liquid distribution and return channels are in fluid communication through the circumferential recirculation manifold.

20 Claims, 6 Drawing Sheets

(51) Int. Cl.
    *B23K 9/28* (2006.01)
    *B23K 9/16* (2006.01)
    *B23K 37/00* (2006.01)
(58) Field of Classification Search
    USPC .................. 219/74, 677, 121.49, 137.62
    See application file for complete search history.

(56) References Cited

U.S. PATENT DOCUMENTS

| | | | |
|---|---|---|---|
| 4,057,704 A | 11/1977 | Geus | |
| 4,508,951 A * | 4/1985 | Rehrig, Jr. | B23K 9/285 219/136 |
| 4,699,211 A * | 10/1987 | Geary | F28F 9/22 165/159 |
| 5,084,605 A | 1/1992 | Tanabe | |
| 5,313,046 A | 5/1994 | Zamuner | |
| 5,362,939 A * | 11/1994 | Hanus | H05H 1/28 219/121.48 |
| 5,670,073 A * | 9/1997 | Kiilunen | B23K 9/323 219/137.62 |
| 5,877,471 A * | 3/1999 | Huhn | H05H 1/30 219/121.43 |
| 5,880,426 A * | 3/1999 | Fukui | H05H 1/28 219/121.49 |
| 5,906,758 A * | 5/1999 | Severance, Jr. | H05H 1/34 219/121.39 |
| 5,965,037 A * | 10/1999 | Bernuchon | B23K 9/127 219/125.12 |
| 5,965,039 A * | 10/1999 | Kitahashi | H05H 1/28 219/121.48 |
| 6,495,798 B1 * | 12/2002 | Enyedy | B23K 9/295 219/137.61 |
| 6,847,009 B2 | 1/2005 | Stuart | |
| 6,946,616 B2 * | 9/2005 | Kinerson | B23K 9/291 219/121.49 |
| 7,005,599 B2 * | 2/2006 | Faslivi | H05H 1/28 219/121.49 |
| 7,030,336 B1 * | 4/2006 | Hawley | H05H 1/34 219/121.49 |
| 8,552,341 B2 * | 10/2013 | Zamuner | B23K 9/123 219/137.31 |
| 8,575,510 B2 * | 11/2013 | Laurisch | H05H 1/34 219/121.48 |
| 8,633,417 B2 * | 1/2014 | Ashtekar | H05H 1/28 219/119 |
| 8,686,317 B2 * | 4/2014 | Centner | B23K 9/285 219/137.42 |
| 8,698,036 B1 * | 4/2014 | Zhang | H05H 1/34 219/121.49 |
| 8,772,667 B2 * | 7/2014 | Yang | B23K 10/00 219/121.48 |
| 8,809,723 B2 * | 8/2014 | Fessl | B23K 9/167 219/121.48 |
| 8,829,385 B2 * | 9/2014 | Yang | B23K 10/00 219/121.48 |
| 8,941,026 B2 * | 1/2015 | Krink | H05H 1/28 219/121.49 |
| 9,006,610 B2 * | 4/2015 | Hung | B23K 9/167 219/137.62 |
| 9,024,228 B2 * | 5/2015 | Yamaguchi | H05H 1/28 219/121.49 |
| 9,216,471 B2 * | 12/2015 | Hassan | B23K 9/173 |
| 2004/0188406 A1 * | 9/2004 | Brabander | B23K 9/067 219/137.61 |
| 2010/0276396 A1 * | 11/2010 | Cooper | B08B 15/04 219/74 |
| 2011/0204035 A1 * | 8/2011 | Grossauer | B23K 9/173 219/137 R |
| 2012/0181255 A1 * | 7/2012 | Bruck | B23K 9/324 219/73.2 |
| 2012/0285932 A1 * | 11/2012 | Yuan | B23K 9/295 219/74 |
| 2014/0251973 A1 * | 9/2014 | Oberndorfer | B23K 9/285 219/137.62 |
| 2014/0263252 A1 * | 9/2014 | Sadowski | B23K 9/26 219/137.42 |
| 2015/0034611 A1 * | 2/2015 | Bauer | H05H 1/28 219/121.49 |
| 2015/0136747 A1 * | 5/2015 | Hassan | B23K 9/295 219/137.52 |
| 2015/0173165 A1 * | 6/2015 | Namburu | H05H 1/28 219/121.49 |

FOREIGN PATENT DOCUMENTS

| | | |
|---|---|---|
| CN | 202894559 U | 4/2013 |
| EP | 0 712 680 B1 | 5/1996 |
| EP | 1 543 910 A1 | 6/2005 |
| GB | 2 189 670 A | 10/1987 |
| KR | 10-2009-0058801 A | 6/2009 |
| KR | 10-2012-0057133 A | 6/2012 |
| KR | 101231087 B1 | 3/2013 |
| KR | 10-1341872 B1 | 12/2013 |
| KR | 10-1364754 B1 | 2/2014 |

OTHER PUBLICATIONS

"Bizel Style mb15 Tip Holder/Gas Diffuser", online document available at http://www.staffordwelding.com.au/products/view/1018/202/mig-torches-consumables/binzel/binzel-style-mb15-tip-holder-gas-diffuser, accessed on Jul. 17, 2014.
"Replacement MB401/501 Gas Diffusers", online document available at http://www.1stopweldingshop.com/Catalogue/Welding-Consumables/MIG-Torches-Spares/Genuine-Binzel/Binzel-MB501-MIG-Torch/Replacement-MB501-Gas-Diffusers, accessed on Jul. 17, 2014.
"Bizel Gas Diffuser Suits MB24 Torch Heat Resistant Rubber 1 Piece", online document available at http://www.thorweldingsupplies.com.au/binzel-style-gas-diffuser/185-binzel-gas-diffuser-suits-mb24-torch-1-piece.html, accessed on Jul. 17, 2014.
"MIG Welding: The DIY Guide", online document available at http://www.mig-welding.co.uk/forum/threads/help-new-welder-what-size-tip.15583/, accessed on Jul. 17, 2014.
Machinery House, Hare & Forbes, online document available at https://www.machineryhouse.com.au/Print?Code=W576&All, accessed on Jul. 17, 2014.
Abimig 452 White Gas Diffuser, online document available at http://www.walshengineering.com/shop/Welding/MIG+Welding+Torches+%252526+Spares/Binzel+Abimig+452/Abimig+452+White+Gas+Diffuser+%28standard%29.html, accessed Jul. 17, 2014.
Abimig 452 M8 Tip Holder, online document available at http://www.walshengineering.com/shop/Welding/MIG+Welding+Torches+%252526+Spares/Binzel+Abimig+452/Abimig+452+M8+Tip+Holder.html, accessed on Jul. 17, 2014.

* cited by examiner

ELECTRIC ARC TORCH WITH COOLING CONDUIT

BACKGROUND

Field of the Disclosure

The present invention relates to torches for generating electric arcs, and in particular to liquid-cooled welding torches.

Description of Related Art

Conventional liquid-cooled torches for generating electric arcs have a cooling tube or conduit located between the base or handle of the torch and the tip of the torch (from which the electric arc is emitted). The torch is heated by the arc during welding, plasma cutting, etc. To remove the heat from the welding torch, cooling liquid, such as water, is circulated through the cooling conduit. The cooling conduit typically has at least two longitudinal cooling passages extending toward the tip of the torch. One of the passages is used to convey cold water toward the tip of the torch, and the other passage is used to return heated water to a chiller or waste receiver. The passages are often on opposite sides of the cooling conduit (e.g., spaced approximately 180° apart). This can result in undesirable temperature gradients across the cooling conduit, with one side of the cooling conduit near the cold water supply passage being cooler than the other side of the cooling conduit near the warm water return passage. Temperature gradients across the cooling conduit in turn can lead to a slight warping of the cooling conduit due to differing amounts of temperature-induced expansion and contraction of the cooling conduit. Warping of the cooling conduit can result in the tip of the torch being misaligned or out of an expected position, which can decrease the precision of the resulting weld or cut, in particular during robotic control of the torch. Thus, it would be desirable to provide a liquid-cooled torch configured for generally uniform cooling of the cooling conduit, so that the temperature-induced expansion/contraction of the cooling conduit is generally uniform (e.g., around the circumference of the cooling conduit).

BRIEF SUMMARY

The following summary presents a simplified summary in order to provide a basic understanding of some aspects of the devices and systems discussed herein. This summary is not an extensive overview of the devices and systems discussed herein. It is not intended to identify critical elements or to delineate the scope of such devices and systems. Its sole purpose is to present some concepts in a simplified form as a prelude to the more detailed description that is presented later.

In accordance with one aspect, provided is a electric arc torch comprising a torch base, and a cooling conduit removably connected to the torch base. The cooling conduit includes a conduit wall forming a central axial bore for conveying shielding gas through the cooling conduit. The cooling conduit includes a plurality of longitudinal cooling channels within the conduit wall and spaced circumferentially around the central axial bore. The longitudinal cooling channels extend longitudinally through the conduit wall from a first end portion of the cooling conduit adjacent the torch base to a second end portion of the cooling conduit distal from the torch base. The longitudinal cooling channels include both a plurality of cooling liquid distribution channels and a plurality of cooling liquid return channels alternately arranged within the conduit wall. The cooling conduit includes a circumferential cooling liquid manifold located at the first end portion of the cooling conduit and in fluid communication with each of the cooling liquid distribution channels. The cooling conduit includes a circumferential return manifold located at the first end portion of the cooling conduit and in fluid communication with each of the cooling liquid return channels. The cooling conduit includes a circumferential recirculation manifold located at the second end portion of the cooling conduit and in fluid communication with each of the cooling liquid distribution channels and each of the cooling liquid return channels such that the cooling liquid distribution channels are in fluid communication with the cooling liquid return channels through the circumferential recirculation manifold. The electric arc torch includes electrical conductor, located within the central axial bore of the cooling conduit, that conducts welding current through the electric arc torch.

In accordance with another aspect, provided is a electric arc torch comprising a cooling conduit comprising a conduit wall forming a central axial bore for conveying shielding gas through the cooling conduit. The cooling conduit includes a plurality of longitudinal cooling channels within the conduit wall and spaced circumferentially around the central axial bore, the longitudinal cooling channels extending longitudinally through the conduit wall from a first end portion of the cooling conduit to a second end portion of the cooling conduit opposite the first end portion. The longitudinal cooling channels include both a plurality of cooling liquid distribution channels and a plurality of cooling liquid return channels alternately arranged within the conduit wall. The cooling conduit includes a return manifold located at the first end portion of the cooling conduit and in fluid communication with each of the cooling liquid return channels, the return manifold comprising a first manifold cap and first circumferential channel formed in at least one of the conduit wall and the first manifold cap. The cooling conduit includes a cooling liquid manifold located at the first end portion of the cooling conduit and in fluid communication with each of the cooling liquid distribution channels, the cooling liquid manifold comprising the first manifold cap and a second circumferential channel formed in at least one of the conduit wall and the first manifold cap, wherein the second circumferential channel is axially offset from the first circumferential channel in an axial direction of the cooling conduit. The cooling conduit includes a recirculation manifold located at the second end portion of the cooling conduit and in fluid communication with each of the cooling liquid distribution channels and each of the cooling liquid return channels, the recirculation manifold comprising a second manifold cap and a third circumferential channel formed in at least one of the conduit wall and the second manifold cap. The electric arc torch includes an electrical conductor, located within the central axial bore of the cooling conduit, that conducts welding current through the electric arc torch.

DETAILED DESCRIPTION

Figure 1:
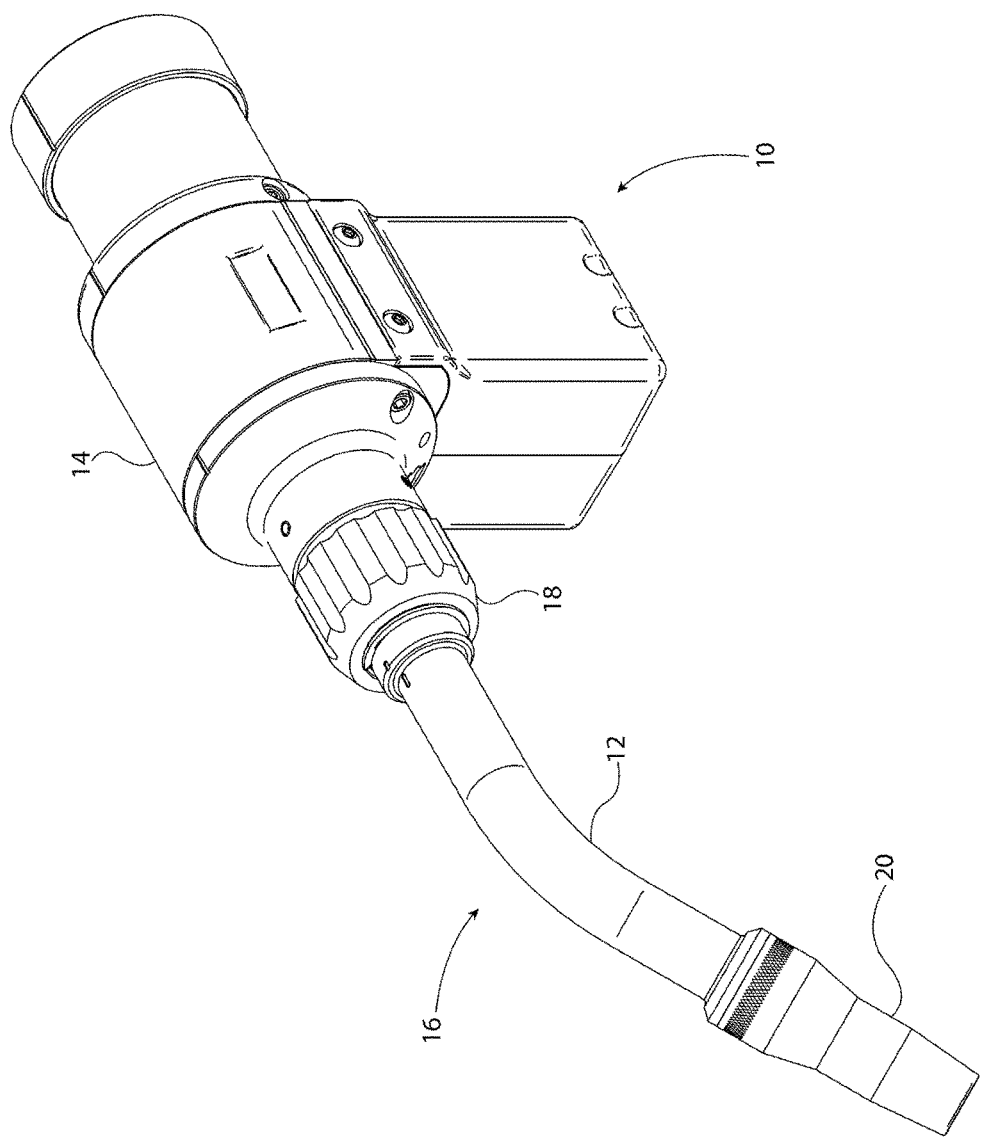
FIG. 1 is a perspective view of a welding torch.

The present subject matter relates to electric arc torches, such as arc welding torches, plasma cutters, and the like. In particular, the present subject matter relates to liquid-cooled torches and portions of torches that convey cooling liquid. The present subject matter will now be described with reference to the drawings, wherein like reference numerals are used to refer to like elements throughout. It is to be appreciated that the various drawings are not necessarily drawn to scale from one figure to another nor inside a given figure, and in particular that the size of the components are arbitrarily drawn for facilitating the understanding of the drawings. In the following description, for purposes of explanation, numerous specific details are set forth in order to provide a thorough understanding of the present subject matter. It may be evident, however, that the present subject matter can be practiced without these specific details. Additionally, other embodiments of the subject matter are possible and the subject matter is capable of being practiced and carried out in ways other than as described. The terminology and phraseology used in describing the subject matter is employed for the purpose of promoting an understanding of the subject matter and should not be taken as limiting.

FIG. 1 shows an example electric arc torch 10 for use in generating an electric arc to be applied to a workpiece. The electric arc could be used, for example, in a welding process, a plasma cutting process, a surface hardening process, and the like. However, for ease of explanation, the torch 10 will be discussed herein in the context of a welding torch used for electric arc welding. Example arc welding processes in which the torch 10, and in particular a cooling conduit 12 of the torch, could be employed include gas metal arc welding (GMAW), flux cored arc welding (FCAW), gas tungsten arc welding (GTAW), submerged arc welding (SAW), shielded metal arc welding (SMAW), etc.

The torch 10 includes a torch base 14 and a removable tube assembly 16. The cooling conduit 12, also known as a gooseneck, is part of the removable tube assembly 16. The cooling conduit 12 is shown as a bent cylinder having a curved central axis. However, the cooling conduit 12 could be straight, or have additional bends (e.g., offsetting bends) if desired.

The torch base 14 supplies shielding gas for the welding process to the tube assembly 16, and also supplies cooling liquid (e.g., water) to the cooling conduit 12 to cool the torch 10. The torch base 14 receives the shielding gas and cooling liquid from remote sources, such as via conduits (not shown). The torch base 14 conducts electrical current from a welding power supply (not shown) to the tube assembly 16, to generate an arc at the tip of the tube assembly 16. The torch base 14 can also supply a consumable wire welding electrode to the tube assembly 16, and the tube assembly can be configured to conduct the welding current to the consumable wire welding electrode, such as via a contact tip. The torch base 14 can include a motorized drive for pushing the consumable wire welding electrode into the tube assembly 16.

The torch base 14 can be mounted to a robotic arm to perform automated robotic welding, or the torch base can be part of a manual welding gun. The torch base 14 can include various controls for a welding process, such as a trigger switch for generating the arc.

The removable tube assembly 16 includes a nut 18 for securing the tube assembly to the torch base 14. The nut 18 and torch base 14 can have corresponding threads or other interlocking components for securing the tube assembly 16 to the base. The tube assembly 16 further includes a nozzle 20 for directing the shielding gas toward the workpiece during welding. The tube assembly 16 and/or torch base 14 can include appropriate keying to ensure that the tube assembly is correctly positioned on the torch base.

Figure 2:
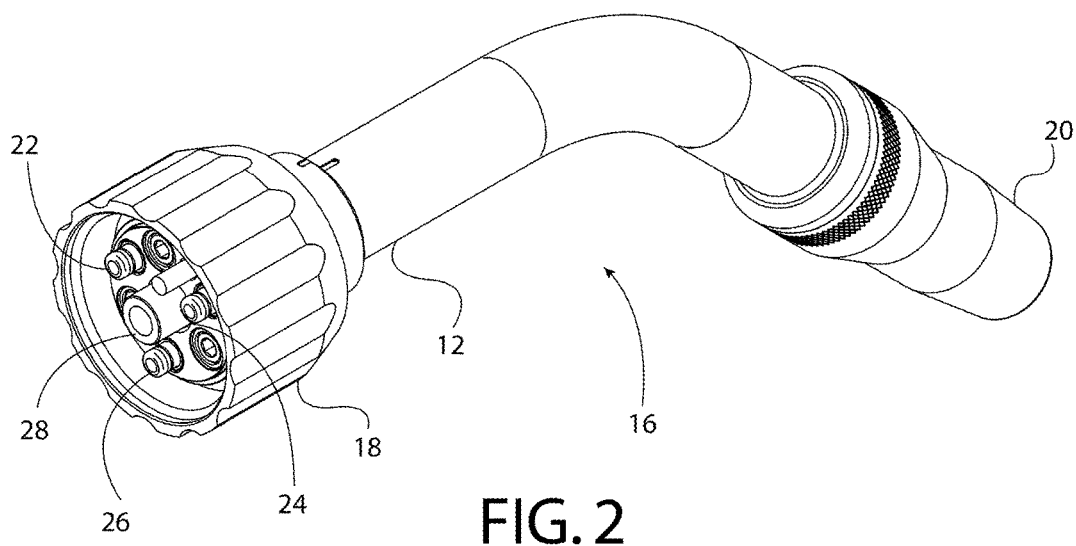
FIG. 2 is a perspective view of a portion of a welding torch.
Figure 3:
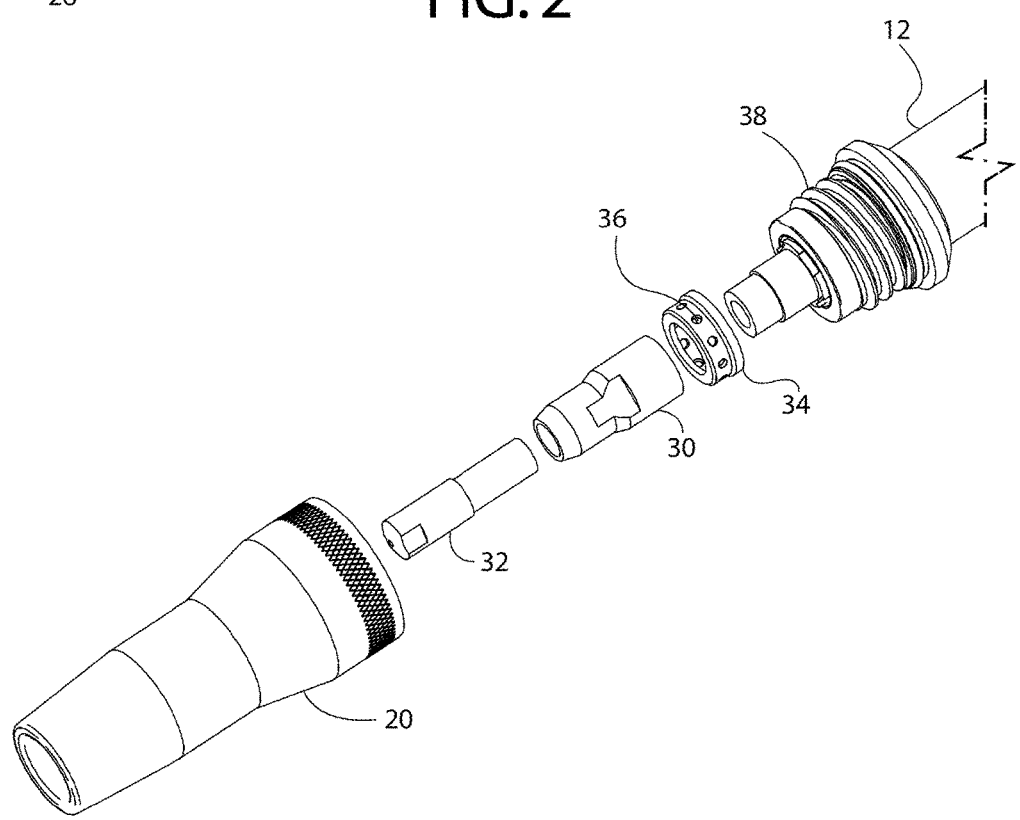
FIG. 3 is an exploded view of a portion of a welding torch.

FIGS. 2 and 3 show further details of the tube assembly 16. The end of the tube assembly 16 that attaches to the torch base is shown in FIG. 2, and the distal end of the tube assembly 16 that is remote from the torch base and adjacent the arc is shown in exploded view in FIG. 3. In FIG. 2, it can be seen that the tube assembly 16 has three fittings 22, 24, 26 for making liquid and gas connections to the torch base. In particular, fitting 22 is a cooling liquid fitting for receiving cooling liquid from the torch base for circulation through the cooling conduit 12. Fitting 24 is a return liquid fitting for recirculating cooling liquid from the cooling conduit 12 through the torch base back to a source of cooling liquid (e.g., to a chiller) or to a waste receiver. Fitting 26 is a shielding gas fitting for receiving shielding gas from the torch base for discharge at the nozzle 20.

The tube assembly 16 includes an electrical conductor 28 for conducting the welding current through the tube assembly to the tip of the torch. In the example embodiment shown in the figures, the electrical conductor 28 is a copper tube having a bore through which the consumable wire electrode can be fed. The electrical conductor 28 can have other configurations if desired, such as a solid cylinder or bar, in particular if no consumable wire electrode is used. The distal end of the electrical conductor 28 is shown in FIG. 3. The tip of the electrical conductor can be threaded to receive a tip holder 30 or shielding gas diffuser (not shown). The tip holder 30 is configured to receive a contact tip 32, which can be threaded into the tip holder. The contact tip 32 conducts welding current from the electrical conductor 28 to the consumable electrode that is fed through the electrical conductor 28 during welding. A ring-shaped electrical insulator 34 can be located between the end of the cooling conduit 12 and the tip holder 30 to insulate the cooling tube 12 from the welding current/voltage applied to the tip holder. The electrical insulator 34 can include an array of gas discharge holes 36 arranged circumferentially around the insulator to radially convey shielding gas from the cooling conduit 12 to the bore of the nozzle 20. The shielding gas travels through an axial bore in the cooling conduit 12 in a circumferential interstice that exists between an inner wall of the cooling conduit 12 and the outer surface of the electrical conductor 28.

The distal end of the cooling conduit 12 includes a threaded nozzle seat cap 38 for receiving the nozzle 20. When assembled, the contact tip 32, tip holder 30 and ring-shaped electrical insulator 36 are located within the bore of the nozzle 20.

Figure 4:
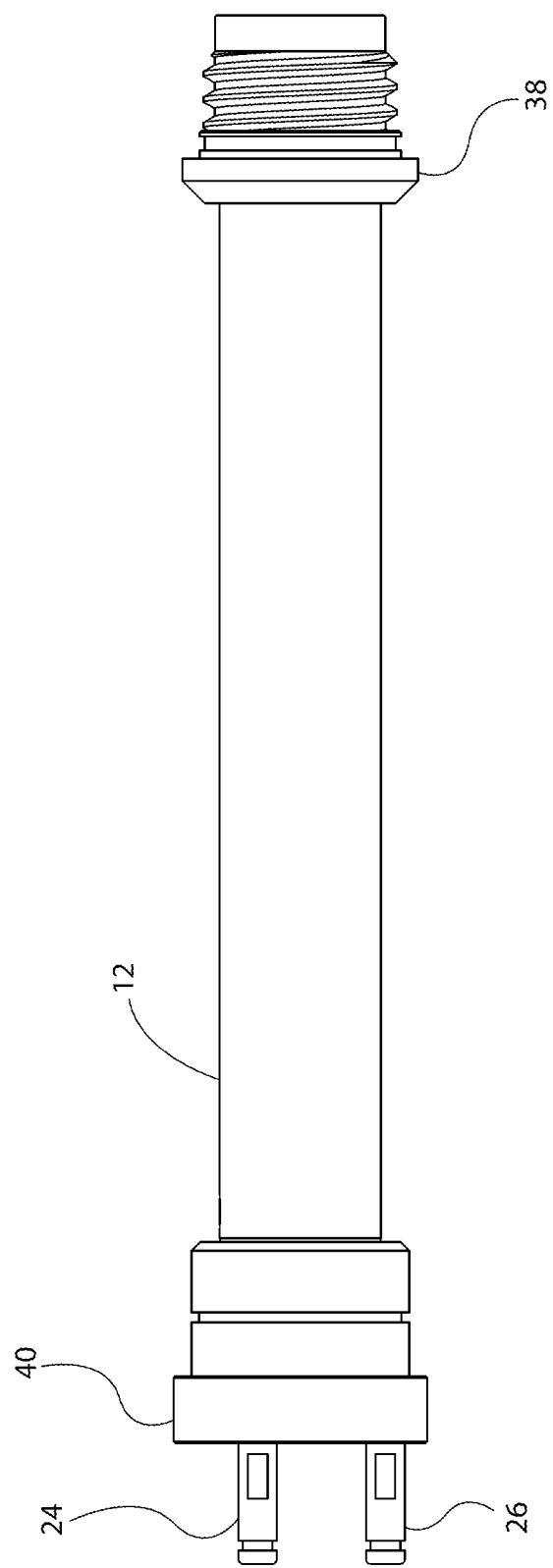
FIG. 4 is a plan view of a cooling conduit of a welding torch.
Figure 5:
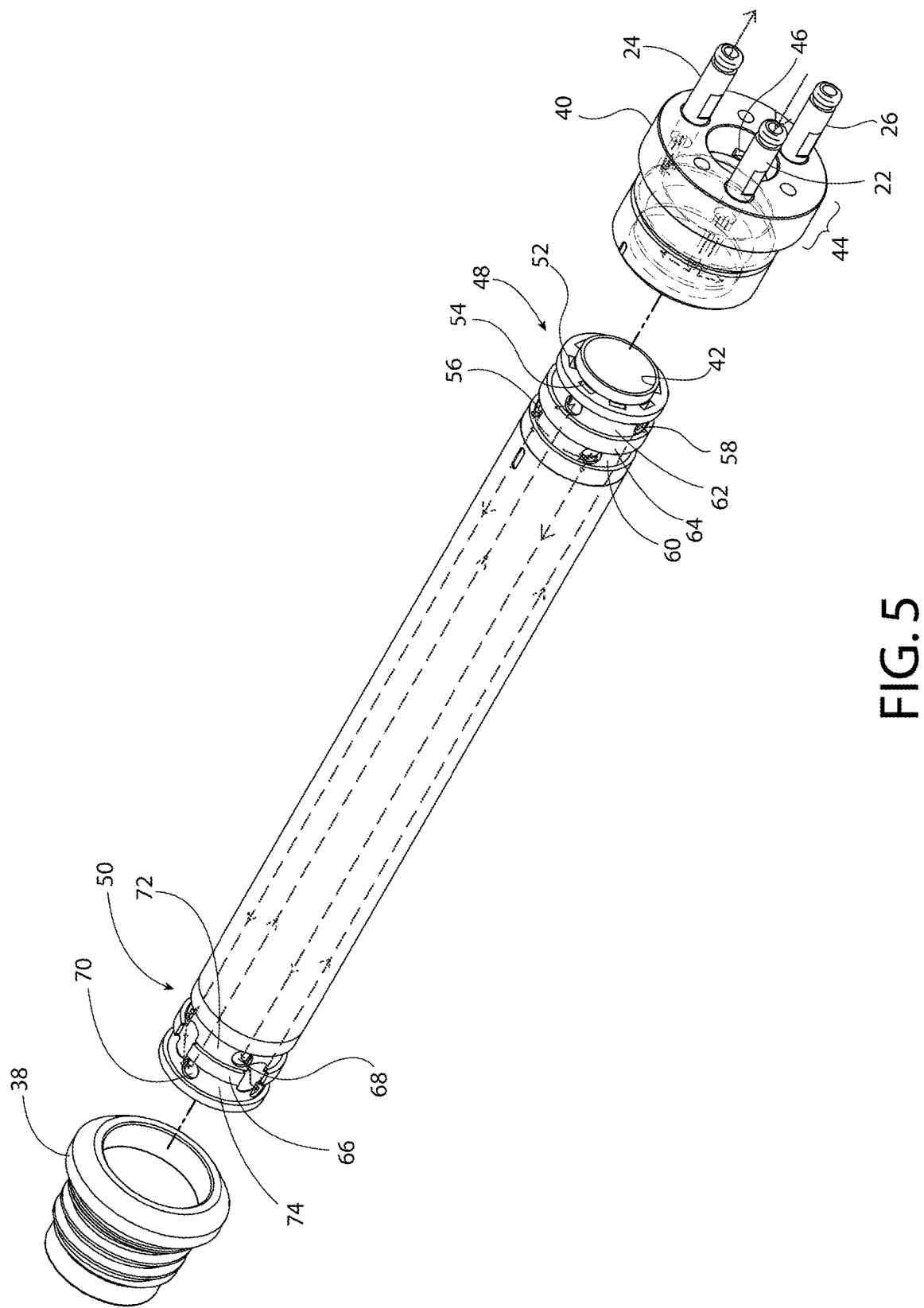
FIG. 5 is an exploded view of the cooling conduit of a welding torch.

FIGS. 4 and 5 show further details of the cooling conduit 12. The cooling conduit 12 is shown as being relatively straight and cylindrical in FIGS. 4 and 5, but could be bent into a gooseneck as shown in FIGS. 1 and 2.

In FIGS. 4 and 5, the nut is removed from the cooling conduit 12, exposing a manifold cap 40. The fittings 22, 24, 26 are connected to the manifold cap 40, and the manifold cap supplies cooling liquid and shielding gas to the cooling conduit. The manifold cap 40 receives heated cooling liquid to be recirculated from the cooling conduit.

The cooling conduit 12 has a conduit wall forming a central axial bore. The electrical conductor (not shown) extends through the central axial bore in the cooling conduit 12, and shielding gas is conveyed through the axial bore in the circumferential interstice between the inner wall 42 of the cooling conduit 12 and the outer surface of the electrical conductor. When placed over the end of the cooling conduit 12, an end portion 44 of the manifold cap 40 projects axially outward from the cooling conduit. The end portion 44 of the manifold cap 40 has an axial bore that is aligned with the axial bore in the cooling conduit 12. The shielding gas fitting 26 discharges shielding gas to an open radial slit 46 in the end portion 44 of the manifold cap 40. Shielding gas flows through the radial slit 46 and into the bore in the end portion 44 of the manifold cap 40. The bore in the end portion 44 of the manifold cap 40 is in fluid communication with the axial bore in the cooling conduit 12. Thus, the shielding gas flows through the shielding gas fitting 26, through the radial slit 46 in the end portion 44 of the manifold cap 40, through the axial bore in the end portion of the manifold cap, and through the axial bore in the cooling conduit.

The cooling conduit 12 includes a plurality of longitudinal cooling channels that are spaced circumferentially around the central axial bore of the cooling conduit. The cooling channels extend longitudinally along the cooling conduit 12 from a first end portion 48 at the manifold cap 40 to a second end portion 50 at the nozzle seat cap 38. The first end portion 48 at the manifold cap 40 would be adjacent the torch base when the torch is assembled, and the second end portion would be distal from the torch base. The longitudinal cooling channels include cooling liquid distribution channels 52 and cooling liquid return channels 54. Cooling liquid flows down the cooling conduit 12 from the first end portion 48 toward the second end portion 50 through the cooling liquid distribution channels. Cooling liquid is recirculated from the second end portion 50 of the cooling conduit 12 to the first end portion 48 through the cooling liquid return channels 54. As the cooling liquid circulates through the cooling conduit 12, it absorbs heat from the cooling conduit, thereby cooling the torch.

The cooling liquid distribution channels 52 and cooling liquid return channels 54 are alternately arranged within the conduit wall of the cooling conduit 12 to provide generally uniform cooling of the cooling conduit. In the example embodiment shown, the cooling conduit 12 includes eight longitudinal cooling channels spaced 45° apart, with four cooling liquid distribution channels 52 being spaced 90° apart, and four cooling liquid return channels 54 being spaced 90° apart. Each cooling liquid distribution channel 52 is located between a pair of cooling liquid return channels 54, and each cooling liquid return channel is located between a pair of cooling liquid distribution channels. The cooling conduit 12 can include fewer or more than eight longitudinal cooling channels, if desired, and the longitudinal cooling channels need not be uniformly or alternately arranged within the conduit wall. However, it can be beneficial to configure the longitudinal cooling channels for generally uniform cooling of the cooling conduit 12, to minimize temperature gradients within the cooling conduit.

The longitudinal cooling channels can be open on an end of the cooling conduit 12 as shown. However, the longitudinal cooling channels need not be open on the end of the cooling conduit 12. If open on the end of the cooling conduit 12 as shown, the open end can be closed off by the manifold cap 40 or nozzle seat cap. The longitudinal cooling channels can be cut or milled from the interior of the conduit wall, e.g., by drilling longitudinally through the wall. Alternatively, the longitudinal cooling channels can be formed from a two-piece cooling conduit in which the channels are cut into the inner wall of an outer tube and then sealed by an inner tube that fits snuggly within the outer tube.

The cooling conduit 12 includes a circumferential cooling liquid manifold and a circumferential return manifold located at the first end portion 48 of the cooling conduit. The circumferential cooling liquid manifold is in fluid communication with each of the cooling liquid distribution channels 52 via a series of radial intake apertures 56 spaced annularly around the cooling liquid manifold 90° apart. The cooling conduit 12 has a respective radial intake aperture 56 for each cooling liquid distribution channel 52. Similarly, the circumferential return manifold is in fluid communication with each of the cooling liquid return channels 54 via a series of radial discharge apertures 58 spaced annularly around the return liquid manifold 90° apart. The cooling conduit 12 has a respective radial discharge 58 aperture for each cooling liquid return channel 54. The circumferential cooling liquid manifold is formed by a circumferential channel 60 in the conduit wall of the cooling conduit 12 that is enclosed or sealed by the manifold cap 40. The circumferential return manifold is formed by another circumferential channel 62 in the conduit wall of the cooling conduit 12 that is also enclosed or sealed by the manifold cap 40. The circumferential channels 60, 62 are substantially parallel and axially offset and separated by a baffle wall 64. It is to be appreciated that the circumferential channels 60, 62 could alternatively be formed in the manifold cap 40, or additional corresponding channels could be formed in the manifold cap.

The manifold cap 40 includes one or more internal passages and discharge ports that are in fluid communication with the cooling liquid fitting 22 and the circumferential cooling liquid manifold, to supply the cooling liquid to the cooling liquid distribution channels 52. The cooling liquid fitting 22 screws into an inlet in the manifold cap 40. The cooling liquid flows through the inlet and internal passage(s) in the manifold cap 40 and is discharged from the discharge port(s) inside of the manifold cap and into the circumferential cooling liquid manifold. The manifold cap 40 also includes one or more internal passages and intake ports that are in fluid communication with the return liquid fitting 24 and the circumferential return manifold, to recirculate the heated cooling liquid from the cooling liquid return channels 54. The return liquid fitting 24 screws into a return outlet in the manifold cap 40. The heated cooling liquid flows out of the circumferential cooling liquid manifold and through the intake port(s) and internal passage(s) in the manifold cap 40 and is discharged to the torch base through the return outlet and fitting 24. Each of the fittings 22, 24, 26 project axially from an end face of the manifold cap 40.

The cooling conduit 12 includes a circumferential recirculation manifold located at the second end portion 50 of the cooling conduit. The circumferential recirculation manifold is similar to the cooling liquid and return manifolds, except that the recirculation manifold is formed in part by a second manifold cap (i.e., the nozzle seat cap 38), and the baffle wall is a segmented baffle wall 66. The segmented baffle wall 66 has a plurality of individual baffle wall segments that are separated from each other. The separations in the segmented baffle wall 66 allow cooling liquid to flow from the cooling liquid distribution channels 52, through the segmented baffle wall, and into the cooling liquid return channels 54. Thus, the cooling liquid distribution channels 52 and into the cooling liquid return channels 54 are in fluid communication with each other via the circumferential recirculation manifold.

The circumferential recirculation manifold is in fluid communication with each of the cooling liquid distribution channels 52 via a series of radial discharge apertures 68, and is in fluid communication with each of the cooling liquid return channels 54 via a series of radial intake apertures 70. There is a respective radial discharge aperture 68 for each cooling liquid distribution channel 52, and a respective radial intake aperture 70 for each cooling liquid return channel 54. The circumferential recirculation manifold is formed by first and second circumferential channels 72, 74 in the conduit wall of the cooling conduit 12 that are enclosed or sealed by the nozzle seat cap 38. The first circumferential channel 72 is a cooling liquid channel to which the cooling liquid distribution channels 52 supply cooling liquid. The second circumferential channel 74 is a return channel that supplies cooling liquid to the cooling liquid return channels 54. The first and second circumferential channels 72, 74 are substantially parallel and axially offset from each other and are partially separated by the segmented baffle wall 66. It is to be appreciated that the circumferential channels 72, 74 could alternatively be formed in the nozzle seat cap 38, or additional corresponding channels could be formed in the nozzle seat cap. Further, the circumferential recirculation manifold could have a single channel open to the cooling liquid distribution channels 52 and the cooling liquid return channels 54, rather than separate circumferential channels 72, 74 separated by the segmented baffle wall 66.

The nozzle seat cap 38 and manifold cap 40 can be attached to the cooling conduit 12 by various known attachment methods, such as brazing or an interference fit for example.

Figure 6:
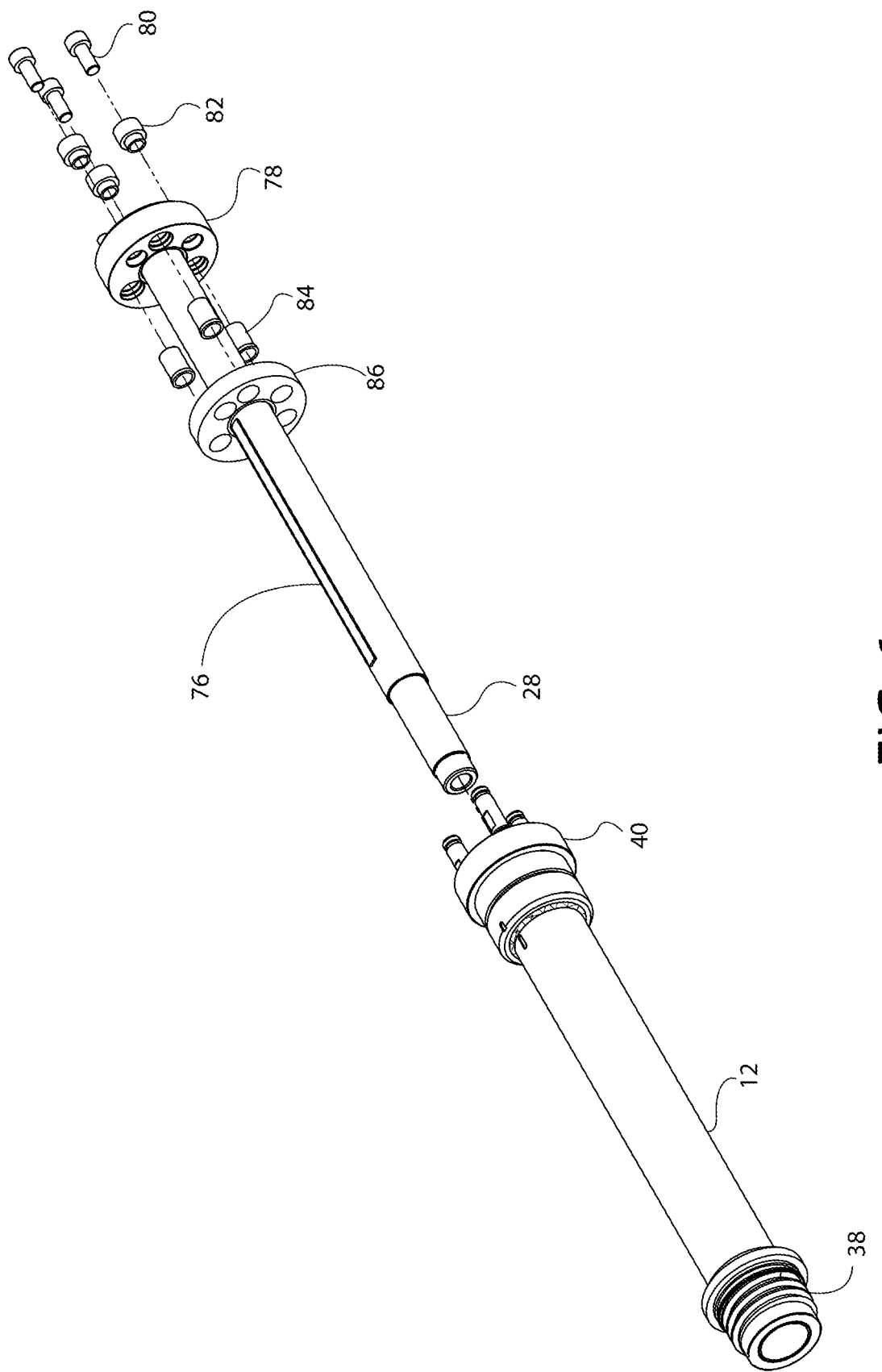
FIG. 6 is an exploded view of the cooling conduit and an electrically conductive tube for conducting welding current.

FIG. 6 provides an exploded view of the cooling conduit 12 and electrical conductor 28 and shows how the electrical conductor can be assembled to the cooling conduit. The electrical conductor 28 is inserted through the axial bore in the cooling conduit 12. The assembly of the cooling conduit 12 and electrical conductor 28 can include various electrical insulators so that the cooling conduit is electrically insulated from the welding current/voltage carried by the electrical conductor 28. For example, portions of the electrical conductor 28 can be covered with heat shrink tubing to insulate the electrical conductor from the cooling conduit 12. The electrical conductor 28 can also include one or more shims 76 to protect the electrical conductor should the cooling conduit 12 be bent into a gooseneck shape.

A mounting flange 78 is attached to an end portion of the electrical conductor 28 by brazing, welding, an interference fit, etc. The mounting flange 78 is secured to the manifold cap 40 to mount the electrical conductor 28 within the central axial bore of the cooling conduit 12. For example, the mounting flange 78 can be secured to the manifold cap 40 using a plurality of fasteners, such as set screws 80. The mounting flange 78 may not be electrically insulated from the electrical conductor 28. In such a case, insulators 82 can be placed between the set screws 80 and mounting flange 78 to prevent the set screws from conducting the welding current/voltage to the manifold cap 40 and cooling conduit 12.

The mounting flange 78 has a plurality of openings through which the fittings 22, 24, 26 on the manifold cap 40 pass when the electrical conductor 28 is mounted to the cooling conduit 12. Insulating sleeves 84 can be placed within the openings for the fittings 22, 24, 26, to prevent the fittings from conducting the welding current/voltage between the mounting flange 78 and the manifold cap 40 and cooling conduit 12.

To insulate the mounting flange 78 from the manifold cap 40, an insulating disc can be placed between the mounting flange 78 and manifold cap 40. The insulating disc between the manifold cap 40 and mounting flange 78 can have a projecting circumferential edge that covers the circumferential edge of the mounting flange 78. Accordingly, the insulating disc can be in the form of an insulating cup 86 that both separates the mounting flange 78 from the manifold cap 40 and covers the circumferential edge of the mounting flange.

Example materials of construction for the cooling conduit 12, nozzle seat cap 38, manifold cap 40, electrical conductor 28 and mounting flange 78 include brass, copper and other suitable metals.

Figure 7:
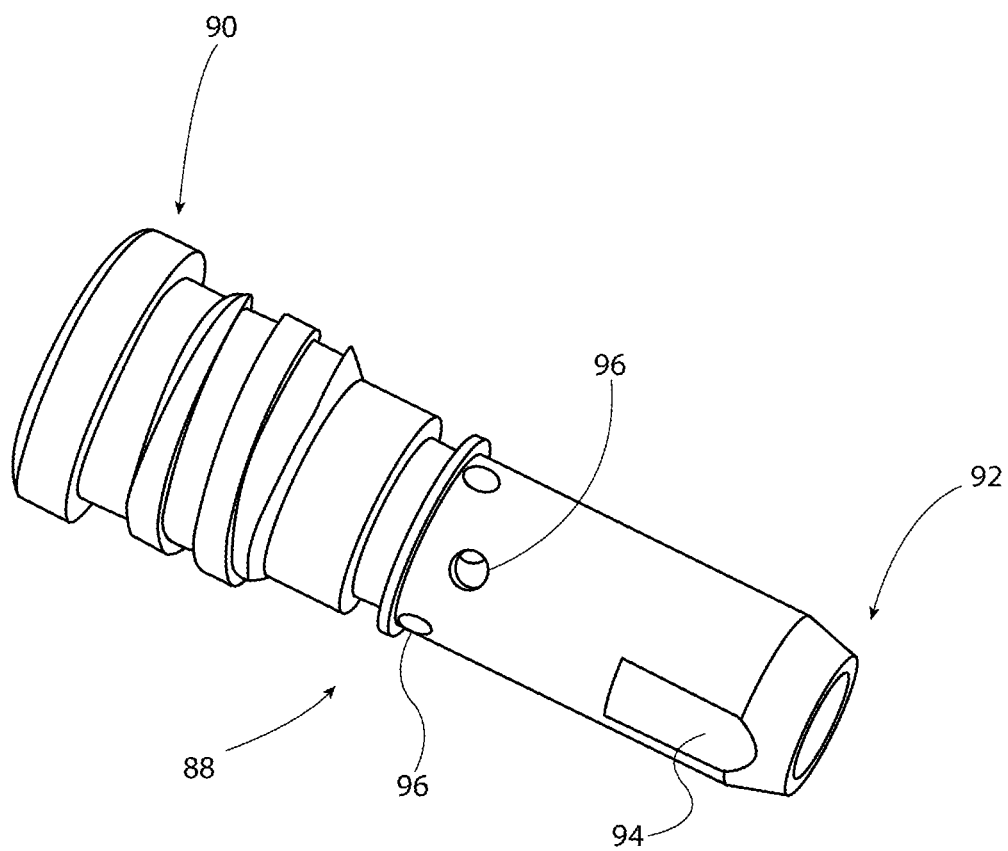
FIG. 7 is a perspective view of a diffuser for the welding torch.

FIG. 7 shows an example shielding gas diffuser 88 with integral contact tip holder that could be used with the electric arc torch discussed herein. The diffuser 88 includes a first end 90 configured to be removably coupled to the gooseneck (e.g., the cooling conduit) of the torch by a threaded connection or other removable mechanical fastener. The diffuser 88 could be used with or without a nozzle 20 (FIG. 3). The first end 90 of the diffuser is shown having external threads for attachment to the torch. Either the nozzle 20, or nozzle seat cap 38 (FIG. 3) can have corresponding internal threads for receiving the diffuser's threaded first end 90 Alternatively, the first end 90 of the diffuser 88 can have internal threads for attachment to the external threads of the nozzle seat cap 38 (FIG. 3).

A second end 92 of the diffuser 88 is configured to receive a contact tip, which can be threaded into the diffuser. The second end 92 of the diffuser 88 further includes a wrench flat 94 that facilitates the installation of the diffuser on the torch using a tool.

In use, the diffuser 88 receives both a consumable wire electrode and the shielding gas from the gooseneck or cooling conduit. The consumable wire electrode passes through the diffuser 88 to the contact tip, and the shielding gas is discharged from the diffuser toward the workpiece. The diffuser 88 includes a plurality of gas apertures 96 for discharging the shielding gas. The gas apertures 96 are arranged in parallel first and second annular arrays. The first and second annular arrays are offset both axially and circumferentially to provide a staggered aperture pattern. In the staggered aperture pattern, the gas apertures 96 alternate between the first and second axially-offset annular arrays when proceeding in a clockwise or counterclockwise direction around the diffuser 88. By staggering the gas apertures 96, rather than placing them in a single annular array, the linear distance between the apertures is increased without substantially affecting the flow of shielding gas. Increasing the linear distance between the apertures 96 provides a mechanically stronger diffuser 88, which is better able to withstand torque loads applied when the diffuser is installed on the torch and/or the contact tip is installed on the diffuser.

It should be evident that this disclosure is by way of example and that various changes may be made by adding, modifying or eliminating details without departing from the fair scope of the teaching contained in this disclosure. The invention is therefore not limited to particular details of this disclosure except to the extent that the following claims are necessarily so limited.

What is claimed is:

1. An electric arc torch, comprising:
a torch base;

a cooling conduit removably connected to the torch base, the cooling conduit comprising a conduit wall forming a central axial bore for conveying shielding gas through the cooling conduit, wherein:
the cooling conduit includes a plurality of longitudinal cooling channels formed within the conduit wall between a common inner wall surface and a common outer wall surface of the conduit wall, and spaced circumferentially around the central axial bore, the longitudinal cooling channels extending longitudinally through the conduit wall from a first end portion of the cooling conduit adjacent the torch base to a second end portion of the cooling conduit distal from the torch base, the longitudinal cooling channels include both a plurality of cooling liquid distribution channels and a plurality of cooling liquid return channels alternately arranged within the conduit wall, the cooling conduit includes a circumferential cooling liquid manifold located at the first end portion of the cooling conduit and in fluid communication with each of the cooling liquid distribution channels, the cooling conduit includes a circumferential return manifold located at the first end portion of the cooling conduit and in fluid communication with each of the cooling liquid return channels, and the cooling conduit includes a circumferential recirculation manifold located at the second end portion of the cooling conduit and in fluid communication with each of the cooling liquid distribution channels and each of the cooling liquid return channels such that the cooling liquid distribution channels are in fluid communication with the cooling liquid return channels through the circumferential recirculation manifold, and an electrical conductor, located within the central axial bore of the cooling conduit, that conducts welding current through the welding torch.

2. The electric arc torch of claim 1, wherein the circumferential cooling liquid manifold and the circumferential return manifold are both formed in part by a manifold cap located at the first end portion of the cooling conduit.

3. The electric arc torch of claim 2, wherein:
the circumferential cooling liquid manifold comprises a circumferential channel formed in the common outer wall surface of the conduit wall,
the circumferential channel is in fluid communication with each of the cooling liquid distribution channels, and
the circumferential channel is surrounded by the manifold cap.

4. The electric arc torch of claim 2, wherein:
the circumferential return manifold comprises a circumferential channel formed in the common outer wall surface of the conduit wall,
the circumferential channel is in fluid communication with each of the cooling liquid return channels, and
the circumferential channel is surrounded by the manifold cap.

5. The electric arc torch of claim 2, wherein the manifold cap comprises a cooling liquid inlet and a cooling liquid discharge port in fluid communication with the circumferential cooling liquid manifold, and a shielding gas inlet and a shielding gas outlet in fluid communication with the central axial bore of the cooling conduit.

6. The electric arc torch of claim 2, wherein the manifold cap comprises a return intake port and a return outlet in fluid communication with the circumferential return manifold, and a shielding gas inlet and a shielding gas outlet in fluid communication with the central axial bore of the cooling conduit.

7. The electric arc torch of claim 1, wherein the circumferential recirculation manifold is formed in part by a nozzle seat cap located at the second end portion of the cooling conduit, wherein the nozzle seat cap is configured for receiving a nozzle of the electric arc torch for directing a discharge flow of the shielding gas.

8. The electric arc torch of claim 7, wherein the circumferential recirculation manifold comprises at least one circumferential channel formed in the common outer wall surface of the conduit wall and in fluid communication with each of the cooling liquid distribution channels and each of the cooling liquid return channels, wherein the at least one circumferential channel is surrounded by the nozzle seat cap, and cooling liquid is discharged from the cooling liquid distribution channels and supplied to the cooling liquid return channels within the at least one circumferential channel.

9. The electric arc torch of claim 8, wherein the at least one circumferential channel formed in the common outer wall surface of the conduit wall comprises:
a cooling liquid channel, formed in the common outer wall surface of the conduit wall, to which the cooling liquid distribution channels discharge cooling liquid, and
a return channel, formed in the common outer wall surface of the conduit wall parallel to the cooling liquid channel, from which the cooling liquid return channels receive cooling liquid,
wherein the cooling liquid channel and the return channel are separated by a plurality of baffle wall segments spaced apart from each other.

10. The electric arc torch of claim 1, further comprising a shielding gas diffuser located adjacent the second end portion of the cooling conduit.

11. The electric arc torch of claim 10, wherein the shielding gas diffuser includes a first array of annular gas apertures and a second array of annular gas apertures, wherein the second array of annular gas apertures is both axially and circumferentially offset from the first array of annular gas apertures.

12. A electric arc torch, comprising:
a cooling conduit comprising a conduit wall forming a central axial bore for conveying shielding gas through the cooling conduit, wherein:
the cooling conduit includes a plurality of longitudinal cooling channels formed within the conduit wall between a common inner wall surface and a common outer wall surface of the conduit wall, and spaced circumferentially around the central axial bore, the longitudinal cooling channels extending longitudinally through the conduit wall from a first end portion of the cooling conduit to a second end portion of the cooling conduit opposite the first end portion, the longitudinal cooling channels include both a plurality of cooling liquid distribution channels and a plurality of cooling liquid return channels alternately arranged within the conduit wall, the cooling conduit includes a return manifold located at the first end portion of the cooling conduit and in fluid communication with each of the cooling liquid return channels, the return manifold comprising a first manifold cap and a first circumferential channel formed in at least one of the conduit wall and the first manifold cap;

the cooling conduit includes a cooling liquid manifold located at the first end portion of the cooling conduit and in fluid communication with each of the cooling liquid distribution channels, the cooling liquid manifold comprising the first manifold cap and a second circumferential channel formed in at least one of the conduit wall and the first manifold cap, wherein the second circumferential channel is axially offset from the first circumferential channel in an axial direction of the cooling conduit;

the cooling conduit includes a recirculation manifold located at the second end portion of the cooling conduit and in fluid communication with each of the cooling liquid distribution channels and each of the cooling liquid return channels, the recirculation manifold comprising a second manifold cap and a third circumferential channel formed in at least one of the conduit wall and the second manifold cap; and an electrical conductor, located within the central axial bore of the cooling conduit, that conducts welding current through the electric arc torch.

13. The electric arc torch of claim 12, wherein the first manifold cap comprises a cooling liquid inlet and a cooling liquid discharge port in fluid communication with the cooling liquid manifold, and a shielding gas inlet and a shielding gas outlet in fluid communication with the central axial bore of the cooling conduit.

14. The electric arc torch of claim 12, wherein the first manifold cap comprises a return intake port and a return outlet in fluid communication with the return manifold, and a shielding gas inlet and a shielding gas outlet in fluid communication with the central axial bore of the cooling conduit.

15. The electric arc torch of claim 12, wherein the first manifold cap comprises:

a cooling liquid inlet and a cooling liquid discharge port in fluid communication with the cooling liquid manifold;

a return intake port and a return outlet in fluid communication with the return manifold; and a shielding gas inlet and a shielding gas outlet in fluid communication with the central axial bore of the cooling conduit, wherein a cooling liquid fitting, a return liquid fitting, and the shielding gas fitting all project from an end face of the first manifold cap.

16. The electric arc torch of claim 12, wherein the second manifold cap is a nozzle seat cap comprising a plurality of threads configured for receiving a nozzle of the electric arc torch for directing a discharge flow of the shielding gas.

17. The electric arc torch of claim 12, wherein the third circumferential channel is a cooling liquid channel, formed in the common outer wall surface of the conduit wall, to which the cooling liquid distribution channels discharge cooling liquid, and the recirculation manifold further comprises a return channel, formed in the common outer wall surface of the conduit wall parallel to the cooling liquid channel, from which the cooling liquid return channels receive cooling liquid, wherein the cooling liquid channel and the return channel are separated by a plurality of baffle wall segments spaced apart from each other.

18. The electric arc torch of claim 17, wherein the cooling conduit has four cooling liquid distribution channels and four cooling liquid return channels alternately arranged within the conduit wall and spaced circumferentially around the central axial bore 45° apart from each other, and wherein the cooling liquid channel of the recirculation manifold includes a respective discharge aperture for each cooling liquid distribution channel, and the return channel of the recirculation manifold includes a respective intake aperture for each cooling liquid return channel.

19. The electric arc torch of claim 12, wherein the cooling conduit has four cooling liquid distribution channels and four cooling liquid return channels alternately arranged within the conduit wall and spaced circumferentially around the central axial bore 45° apart from each other, and wherein the second circumferential channel of the cooling liquid manifold includes a respective intake aperture for each cooling liquid distribution channel, and the first circumferential channel of the return manifold includes a respective discharge aperture for each cooling liquid return channel.

20. The electric arc torch of claim 12, further comprising a shielding gas diffuser located adjacent the second end portion of the cooling conduit, wherein the shielding gas diffuser includes a first array of annular gas apertures and a second array of annular gas apertures, and wherein the second array of annular gas apertures is both axially and circumferentially offset from the first array of annular gas apertures.

\* \* \* \* \*